(12) United States Patent
Rehn et al.

(10) Patent No.: US 11,541,862 B2
(45) Date of Patent: Jan. 3, 2023

(54) OPERATOR SELECTABLE STEERING MODE WITH VARIABLE TORQUE FEEDBACK AND SYSTEM THEREOF

(71) Applicant: DEERE & COMPANY, Moline, IL (US)

(72) Inventors: Nathanael K. Rehn, Waterloo, IA (US); Jeffrey M. Tott, New Hartford, IA (US); Trent L. Goodnight, Hudson, IA (US)

(73) Assignee: Deere & Company, Moline, IL (US)

( * ) Notice: Subject to any disclaimer, the term of this patent is extended or adjusted under 35 U.S.C. 154(b) by 117 days.

(21) Appl. No.: 17/004,143

(22) Filed: Aug. 27, 2020

(65) Prior Publication Data
US 2022/0063581 A1 Mar. 3, 2022

(51) Int. Cl.
*B60W 30/045* (2012.01)
*B60W 30/18* (2012.01)
(Continued)

(52) U.S. Cl.
CPC .......... *B60W 10/20* (2013.01); *B60W 40/105* (2013.01); *B60W 40/109* (2013.01);
(Continued)

(58) Field of Classification Search
None
See application file for complete search history.

(56) References Cited

U.S. PATENT DOCUMENTS

| 2,508,057 A | 5/1950 | Bishop |
| 6,535,806 B2 | 4/2003 | Notagashira |

(Continued)

FOREIGN PATENT DOCUMENTS

| BR | 102013023161 B1 | 7/2015 |
| DE | 112014001998 T5 | 12/2015 |

(Continued)

OTHER PUBLICATIONS

Screen Print from Deere Operator's Manual, publicly available at least as early as Apr. 2015, 1 page.
(Continued)

*Primary Examiner* — Adam D Tissot
*Assistant Examiner* — Laura E Linhardt
(74) *Attorney, Agent, or Firm* — Taft Stettinius & Hollister; Stephen F. Rost

(57) ABSTRACT

A method of controlling a work machine having at least one wheel includes providing a controller, an operator control, and a steering system including a steering wheel position sensor, a road wheel angle sensor, a speed sensor, and a feedback device. The method includes detecting a change in steering wheel position via the steering wheel position device and a wheel speed of the at least one wheel via the speed sensor. A predicted lateral acceleration is calculated by the controller as a function of wheel speed and a feedback torque is determined by the controller as a function of the predicted lateral acceleration. The feedback torque is determined from a plurality of feedback torque curves stored by the controller, where each of the plurality of feedback torque curves corresponds to a sensitivity level selectable from the operator control. The feedback torque is commanded to the feedback device.

20 Claims, 15 Drawing Sheets

(51) Int. Cl.
  *B60W 40/107* (2012.01)
  *B62D 5/00* (2006.01)
  *B62D 6/00* (2006.01)
  *G05B 15/02* (2006.01)
  *B60W 10/20* (2006.01)
  *B60W 50/10* (2012.01)
  *B62D 5/09* (2006.01)
  *B60W 40/109* (2012.01)
  *B60W 40/105* (2012.01)

(52) U.S. Cl.
  CPC ............ *B60W 50/10* (2013.01); *B62D 5/006* (2013.01); *B62D 5/091* (2013.01)

(56) References Cited

U.S. PATENT DOCUMENTS

| | | | |
|---|---|---|---|
| 6,795,763 | B2 | 9/2004 | Yao et al. |
| 6,945,353 | B2 | 9/2005 | Bishop |
| 7,233,850 | B2 | 6/2007 | Nakano et al. |
| 7,234,563 | B2 | 6/2007 | Ogawa et al. |
| 7,377,356 | B2 | 5/2008 | Turner et al. |
| 7,520,365 | B2 | 4/2009 | Fukuba et al. |
| 7,617,033 | B2 | 11/2009 | Katou |
| 7,686,124 | B2 | 3/2010 | Hublart et al. |
| 7,908,056 | B2 | 3/2011 | Hwang |
| 8,249,777 | B2 | 8/2012 | Greul et al. |
| 8,321,090 | B2 | 11/2012 | Sakuma |
| 8,718,873 | B2 | 5/2014 | Kushiro |
| 9,050,999 | B2 | 6/2015 | Kuipers et al. |
| 9,205,867 | B2 | 12/2015 | Takeda |
| 9,393,992 | B2 | 7/2016 | Ognibene |
| 9,469,340 | B2 | 10/2016 | Morselli et al. |
| 9,592,848 | B1 | 3/2017 | Hirate et al. |
| 9,771,102 | B2 | 9/2017 | Sakurai |
| 10,053,146 | B2 | 8/2018 | Morselli et al. |
| 10,589,775 | B2 | 3/2020 | Polmans et al. |
| 10,661,823 | B2 | 5/2020 | Delmarco et al. |
| 10,710,629 | B2 | 7/2020 | Morselli et al. |
| 10,807,637 | B2 | 10/2020 | Kodera |
| 10,953,916 | B2 | 3/2021 | Polmans |
| 2014/0343697 | A1* | 11/2014 | Kuipers ............ B60W 50/085 700/83 |
| 2019/0092377 | A1 | 3/2019 | Shin et al. |
| 2019/0217885 | A1 | 7/2019 | Figura et al. |
| 2020/0062241 | A1 | 2/2020 | Kelber |
| 2020/0062292 | A1 | 2/2020 | Shin |
| 2020/0122770 | A1 | 4/2020 | Rasmussen |
| 2020/0189649 | A1 | 6/2020 | Polmans et al. |
| 2020/0231209 | A1 | 7/2020 | Walentowski |
| 2020/0277003 | A1 | 9/2020 | Horvath |
| 2020/0339191 | A1 | 10/2020 | Polmans et al. |
| 2020/0346682 | A1 | 11/2020 | Forte et al. |
| 2020/0391789 | A1 | 12/2020 | Kim |
| 2020/0398891 | A1 | 12/2020 | Szepessy et al. |
| 2021/0001930 | A1 | 1/2021 | Ognibene |
| 2021/0024123 | A1 | 1/2021 | Vizer et al. |
| 2021/0070361 | A1 | 3/2021 | Erickson et al. |
| 2021/0163061 | A1 | 6/2021 | Schemmel et al. |
| 2021/0253158 | A1* | 8/2021 | Hultén ............ B62D 5/008 |
| 2022/0017071 | A1* | 1/2022 | Mei ............ B60W 10/18 |

FOREIGN PATENT DOCUMENTS

| | | |
|---|---|---|
| DE | 102020203545 A1 | 9/2020 |
| EP | 3492344 A1 | 6/2019 |
| WO | 2020152188 A1 | 7/2020 |

OTHER PUBLICATIONS

"New Holland T7: Steering to a New Level of Control and Comfort"; https://agriculture.newholland.com/eu/en/uk/about-us/whats-on/news-events/2017/steering-to-a-new-level-of-control-and-comfort.

T6 Series—Tier 4B; https://agriculture.newholland.com/nar/en-us/equipment/products/tractors-telehandlers/t6-series-tier-4b.

New Holland Agriculture; Faststeer Efficiency | NHAG; https://agriculture.newholland.com/apac/en/equipment/products/agricultural-tractors/t6000/detail/faststeer-efficiency; Date: Sep. 15, 2021; pp. 1-3.

New Holland Agriculture; CNHI Industrial Press Release; CustomSteer; Date: Jul. 21, 2017; pp. 1-4.

Xi Zhang, Investigation and development of different guidance approaches for off-road drawbar connected vehicles, Institute for Vehicle System Technology (FAST) Karlsruhe, 2013, 182 pages, retrieved from <https://publikationen.bibliothek.kit.edu/1000033341>.

German Search Report issued in application No. 102021207966.0, dated Jul. 13, 2022, 5 pages.

\* cited by examiner

OPERATOR SELECTABLE STEERING MODE WITH VARIABLE TORQUE FEEDBACK AND SYSTEM THEREOF

FIELD OF THE DISCLOSURE

The present disclosure relates to a work machine, and in particular, to an operator adjustable steering modes for controlling a steering system of the work machine.

BACKGROUND

Off-road work machines encounter an extremely wide range of surface conditions during operation. In addition, many off road work machines carry heavy loads or pull heavy implements. In addition, there are many different tire options available which affect vehicle dynamics. For example, agricultural work machines often carry or pull heavy implements hitched to the rear of the vehicle. These large loads can often alter the steering characteristics of the machine. For example, when lightly loaded a machine may have a desirable and relatively stable "understeer" characteristic. But, when heavily loaded, the same machine may have an undesirable relatively unstable "oversteer" characteristic.

Moreover, operators of these work machines often want more control over the steering system. In particular, operators desire to feel an amount of feedback when steering the machine. Some operators prefer a more sensitive steering system where more feedback can be felt whereas other operators desire a less sensitive steering system.

It would be desirable to provide a work machine with a steer-by-wire steering control system which allows vehicle operators to adjust or tune the sensitivity of the steering system and receive a desired feedback when controlling the machine.

SUMMARY

In one embodiment of the present disclosure, a method of controlling a work machine having at least one steered wheel includes providing a controller, an operator control, and a steering system including a steering wheel position sensor, a road wheel angle sensor, a speed sensor, and a feedback device; detecting a change in steering wheel position via the steering wheel position device; detecting a wheel speed of the at least one steered wheel via the speed sensor; calculating a predicted lateral acceleration of the work machine by the controller as a function of wheel speed; determining a feedback torque by the controller as a function of the predicted lateral acceleration, the feedback torque being determined from a plurality of feedback torque curves stored by the controller, where each of the plurality of feedback torque curves corresponds to a sensitivity level selectable from the operator control; and outputting a feedback torque command by the controller to the feedback device where the feedback torque command comprises the feedback torque determined from one of the plurality of feedback torque curves as a function of the predicted lateral acceleration computed in the calculating step.

In one example of this embodiment, the method may include providing dynamic feedback to a steering wheel of the work machine based on the feedback torque. In a second example, the outputting step comprises outputting a feedback torque command comprising a base feedback torque and the feedback torque, where the feedback torque is greater than the base feedback torque. In a third example, the method may include receiving a command from the user control corresponding to the base feedback torque.

In a fourth example, the plurality of feedback torque curves comprises at least a first curve and a second curve, the first curve corresponding to a first sensitivity level and the second curve corresponding to a second sensitivity level. In a fifth example, the method may include outputting a greater amount of feedback torque at the first sensitivity level than at the second sensitivity level. In a sixth example, the method may include receiving a command from the operator control selecting the first sensitivity level or the second sensitivity level.

In a seventh example, the method may include providing a plurality of on-center steering ratio curves stored in the controller, where each of the plurality of on-center steering ratio curves defines a steering ratio as a function of road wheel angle. In an eighth example, the method may include detecting road wheel angle via the road wheel angle sensor; determining a steering ratio from one of the plurality of on-center steering ratio curves based on the selection of the first sensitivity level or the second sensitivity level and as a function of the road wheel angle.

In another embodiment of the present disclosure, an electrohydraulic steer-by-wire steering system for steering at least one wheel of a work machine includes a controller; an operator control in communication with the controller, the operator control configured to being selectable by an operator of the work machine; a steering wheel position sensor for detecting a change in position of a steering wheel of the work machine; a road wheel angle sensor for detecting a road wheel angle of the at least one wheel; a speed sensor for detecting a wheel speed of the at least one wheel; a software algorithm executable by the controller, the software algorithm comprising a plurality of on-center steering ratio curves based on the road wheel angle of the at least one wheel; wherein, the plurality of on-center steering ratio curves comprises at least a first curve and a second curve, the first curve outputting a first maximum steering ratio over a first defined range of road wheel angles and the second curve outputting a second maximum steering ratio over a second defined range of road wheel angles; wherein, the first maximum steering ratio is greater than the second maximum steering ratio at any road wheel angle located within the first and second defined ranges.

In one example of this embodiment, the first defined range is less than the second defined range of road wheel angles. In a second example, each of the plurality of on-center steering ratio curves comprises a default steering ratio when operating outside of a corresponding defined range of road wheel angles. In a third example, the steering ratio of the first curve and the second curve is approximately the same when the road wheel angle is outside of both the first and second defined ranges.

In a fourth example, the user control comprises a display screen including at least a first user selectable control and a second user selectable control; the first user selectable control triggering the controller to execute the software algorithm in accordance with the first curve; the second user selectable control triggering the controller to execute the software algorithm in accordance with the second curve. In a fifth example, the system may include a feedback device in communication with the controller and the steering wheel, the feedback device configured to provide a feedback torque to the steering wheel as a function of predicted lateral acceleration.

In a further embodiment of the present disclosure, an electrohydraulic steer-by-wire steering system for steering at least one wheel of a work machine includes a controller; an operator control in communication with the controller, the operator control configured to being selectable by an operator of the work machine; a steering wheel position sensor for detecting a change in position of a steering wheel of the work machine; a road wheel angle sensor for detecting a road wheel angle of the at least one wheel; a speed sensor for detecting a wheel speed of the at least one wheel; a software algorithm executable by the controller, the software algorithm comprising a plurality of on-center steering ratio curves based on the road wheel angle of the at least one wheel; wherein, the plurality of on-center steering ratio curves comprises at least a first curve and a second curve, the first curve outputting a first maximum steering ratio over a first defined range of road wheel angles and the second curve outputting a second maximum steering ratio over a second defined range of road wheel angles; wherein the first defined range is less than the second defined range of road wheel angles.

In one example of this embodiment, the first maximum steering ratio is greater than the second maximum steering ratio at any road wheel angle located within the first and second defined ranges. In a second example, the user control comprises a display screen including at least a first user selectable control and a second user selectable control; the first user selectable control triggers the controller to execute the software algorithm in accordance with the first curve; the second user selectable control triggers the controller to execute the software algorithm in accordance with the second curve. In another example, the system may include a feedback device in communication with the controller and the steering wheel, the feedback device configured to provide a feedback torque to the steering wheel as a function of predicted lateral acceleration.

In a further example, the plurality of on-center steering ratio curves comprises a third curve outputting a third maximum steering ratio over a third defined range of road wheel angles; wherein, the third defined range is greater than the first and second defined ranges of road wheel angles.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
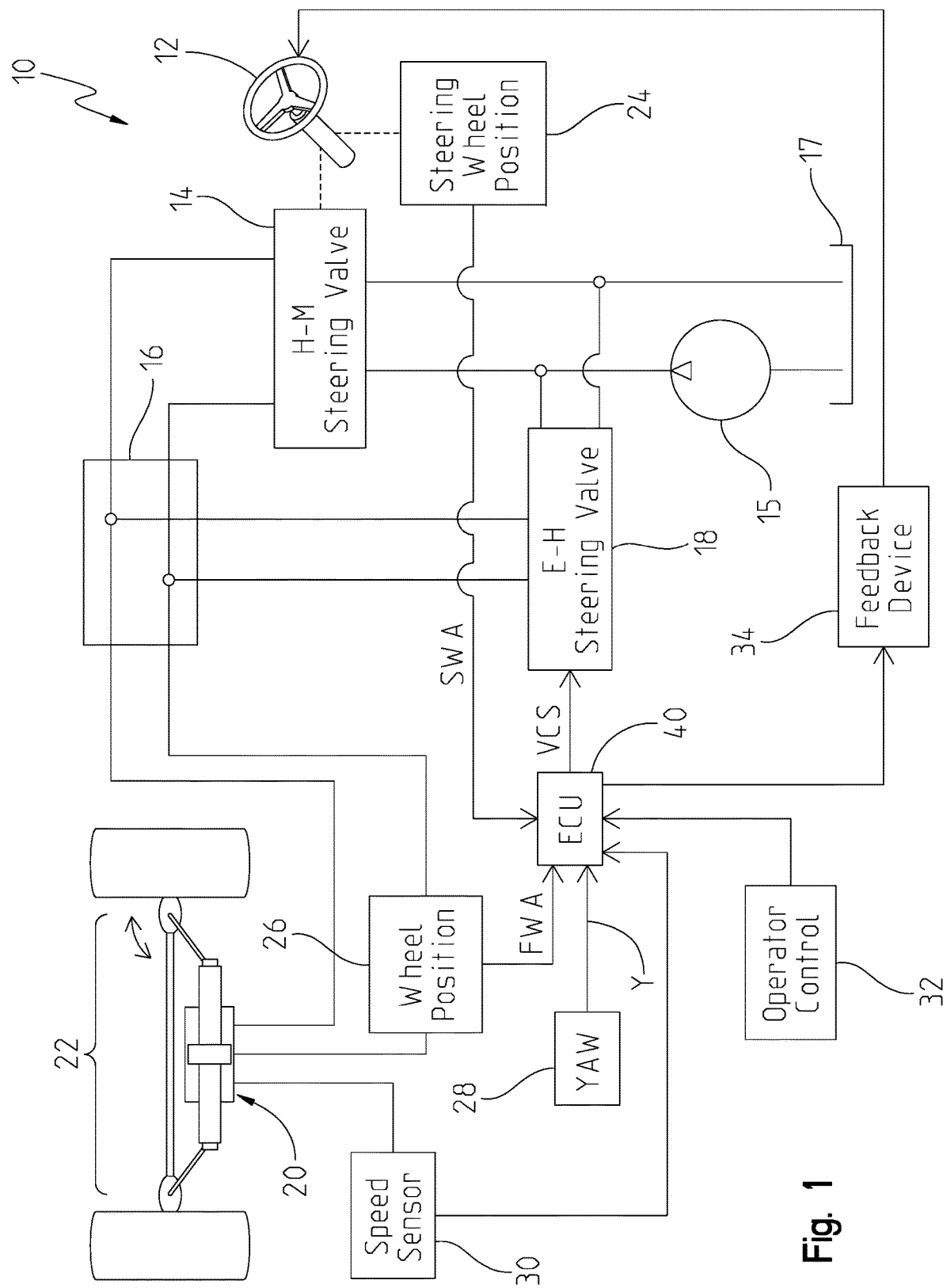
FIG. 1 is a schematic of a steering control system of a work machine.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Steering performance is one of the primary factors of vehicle roadability influencing tractor purchase decisions for customers around the globe. More and more tractors are operated in transport on narrow roadways with hills, curves, roundabouts, and of course with other traffic. Precise and confident steering control is desired by machine operators. In addition, machine operators often have different preferences for vehicle steering sensitivity, and vehicle dynamics can change quickly. As a result, there is a need for an on-the-go or real-time system available to an operator to adjust the sensitivity of the steering system. For instance, when controlling the work machine in a straight line, a greater sensitivity level will provide increased feedback to the operator, whereas a lower sensitivity level will not provide as much feedback. Further, at a higher sensitivity level, a small movement of the steering wheel will achieve a greater change in road wheel angle when compared to operating at a lower sensitivity level. The present disclosure provides an operator the ability to adjust the steering sensitivity while operating the work machine.

In the present disclosure, an active command steering system is provided which can include an electronically controlled steering wheel torque algorithm to give the operator real-time feedback designed to prevent over-steer and under-steer to position the tractor precisely as intended. This allows work machines to excel in the area of transport steering performance. The steering system may represent a tactile feedback device including an integrated steering wheel brake and position sensor for precise, confident and adjustable steering control along with a seamless transition from road to field. The system may also include a customizable user interface.

Referring to FIG. 1, one embodiment of a vehicle steering system 10 includes a steering wheel 12 coupled in a known manner to a conventional hydro-mechanical steering valve 14. The steering valve 14 is hydraulically connected to a hydraulic combiner or "T" unit 16. An electro-hydraulic steering valve 18 may also be connected hydraulically to the T unit 16. The steering valves 14 and 18 may both be hydraulically connected to a steering supply pump 15 and a reservoir 17. The T unit 16 can combine the flows from the steering valves 14 and 18 and supply the combined flows to a conventional steering cylinder 20, which controls the angle of the steered wheels 22 through a conventional steering linkage. The steerable wheels 22 may be front or rear wheels.

A steering wheel position sensor 24 may be coupled to the steering wheel 12, as shown. The steering wheel sensor 24 generates a steering wheel angle signal (SWA) which changes in value as the steering wheel 12 is rotated. A steered wheel angle sensor 26 may be coupled to the steered wheels 22, and generates a steered wheel angle signal. The wheel angle sensor 26 may be a flow meter type sensor, for example. Hereinafter the steered wheel angle signal will be referred to simply as a wheel angle signal (FWA) to avoid confusion with the steering wheel angle (SWA). A gyroscopic yaw rate sensor 28 may be provided to generate a vehicle yaw rate signal (Y) and a steered wheel speed sensor 30 may detect rotational wheel speed of the steered wheels 22.

An electronic control unit (ECU) 40 can receive the steering wheel angle signal SWA, the front wheel angle signal FWA, the yaw rate signal Y, and a rotational wheel speed. The ECU 40 executes an algorithm and generates a pulse width modulated control signal which is communicated to the electro-hydraulic valve 18. Moreover, the ECU 40 may be in communication with a tactile feedback device (TFD) 34 which provides feedback to the operator via the steering wheel 12. This will be described in greater detail below.

The steering system may be a steer-by-wire steering system which is electronically controlled and comprises an electro-hydraulic steering system. In other words, there is no mechanical interaction between the operator and the steered wheels.

One of the features of the present disclosure is the ability for an operator to controllably adjust the sensitivity of the steering system and amount of torque feedback received via the TFD 34. To provide this, an operator control 32 may be in communication with the ECU 40. The operator control 32 may be in the form of a lever, switch, push button, or the like. Alternatively, the operator control 32 may be in the form of a touchscreen display similar to that shown in FIGS. 2 and 3.

Figure 2:
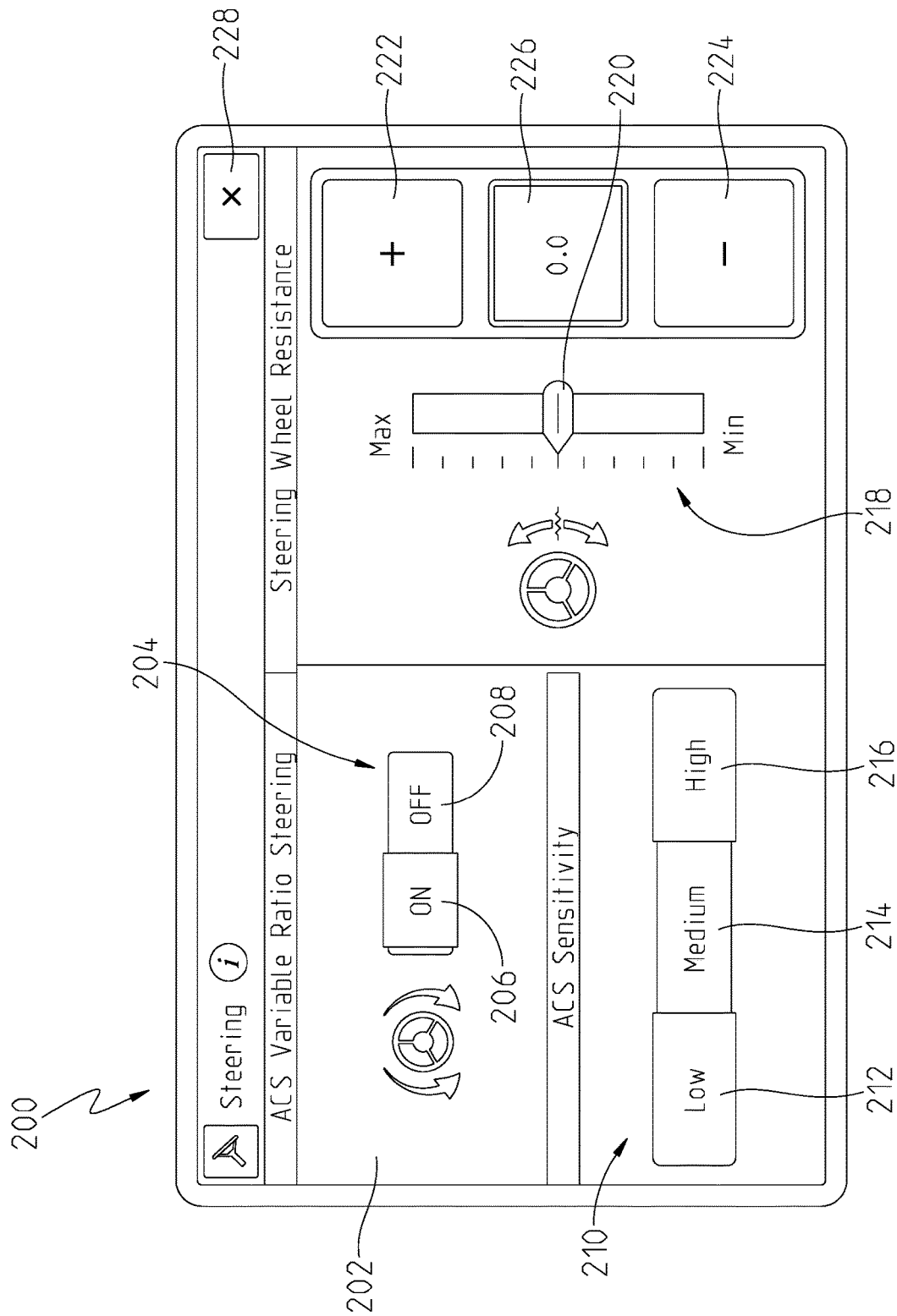
FIG. 2 is a screen display of an operator control in a cab of a work machine.

Turning to FIG. 2, for example, a display 200 is shown. The display 200 may comprise a touchscreen 202 including a plurality of selectable user controls for controlling the steering system of the work machine. The screen 202 may include an option for selectively activating or controlling variable ratio steering 204, active command steering sensitivity 210, and steering wheel resistance 218. The variable ratio steering 204 is a selectable option by the operator to adjust an amount of steering wheel turns based on ground speed. The variable ratio steering 204 may include a first user selectable control 206 for activating this option and a second user selectable control 208 for deactivating the option.

The active command steering (ACS) sensitivity 210 is a selectable option by the operator to adjust a sensitivity level of turning the steering wheel and the steering wheel force/torque feedback at transport speeds. The machine may operate in at least a field mode and a transport mode. In field mode, the machine may operate within a first speed range desirable for performing a work function (e.g., mowing, planting, spraying, tilling, etc.). In transport mode, the machine may operate within a second speed range desirable for transporting or moving from one location to another without performing the work function (e.g., travelling along a roadway). The first speed range may partially overlap with the second speed range, but the maximum transport mode speed is generally higher than the maximum field mode speed. Moreover, while the machine is capable and will turn or corner while operating in field mode, it is more likely that the machine will turn or corner at a higher speed while in transport mode than in field mode.

The ACS sensitivity 210 may include a first user selectable control 212 corresponding to a low sensitivity level, a second user selectable control 214 corresponding to a medium sensitivity level, and a third user selectable control 216 corresponding to a high sensitivity level. The different sensitivity levels can adjust an on-center steer ratio. The low sensitivity level may be a decreased steering sensitivity to aid in straight line holding, primarily when transporting on rough terrain. The torque feedback is also reduced at transport speeds. The medium sensitivity level is generally a midpoint of steering sensitivity and feedback, whereas the high sensitivity level is an increased sensitivity to steering wheel commands with increased force feedback at transport speeds.

The steering wheel resistance 218 is a selectable option by the operator to adjust the setting for the force required to turn the steering wheel. The steering wheel resistance 218 may include a slide bar 220 which moves between a minimum level and a maximum level, as shown in FIG. 2. A first user selectable control 222 allows an operator to increase the force or torque feedback and a second user selectable control 224 allows an operator decrease this same force or torque feedback. A feedback or resistance value 226 may be displayed to the user as it is increased or decreased via the different controls.

The display screen 202 may also include a user selectable control 228 for exiting the screen 202. Thus, an operator may be able to select this screen 202 from a plurality of options on the display 200.

FIGS. 8-14 illustrate additional display screens with one or more of the different selectable user controls be actuated on or off. These display screens are illustrative of different examples of how an operator may be able to turn different options on or off, adjust sensitivity settings, and adjust torque feedback during machine operation. An operator, for example, may be to make one or more of these selections from a cab of the work machine.

Figure 3A:
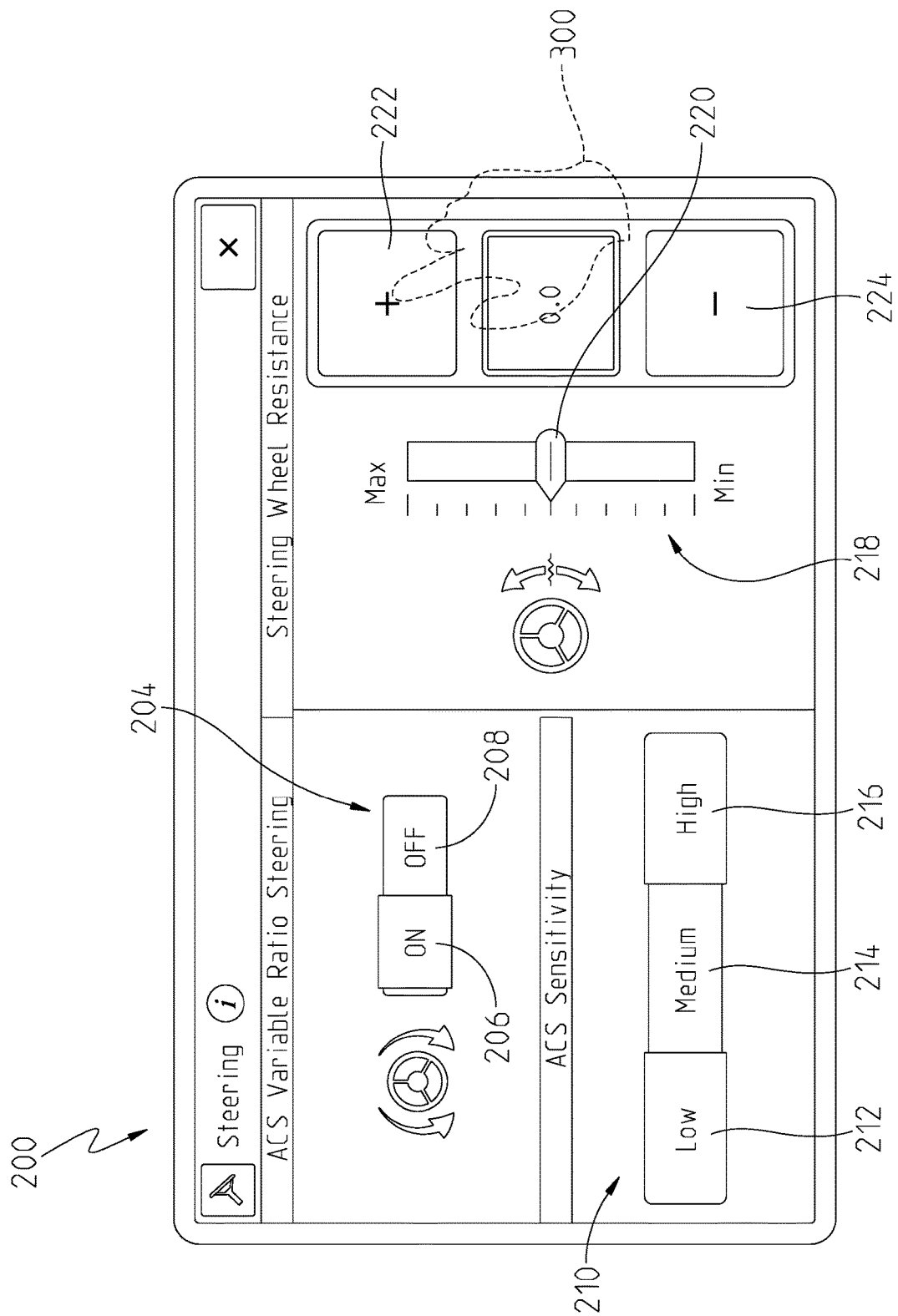
FIGS. 3A-B are another screen display of the operator control of FIG. 2.
Figure 3B:
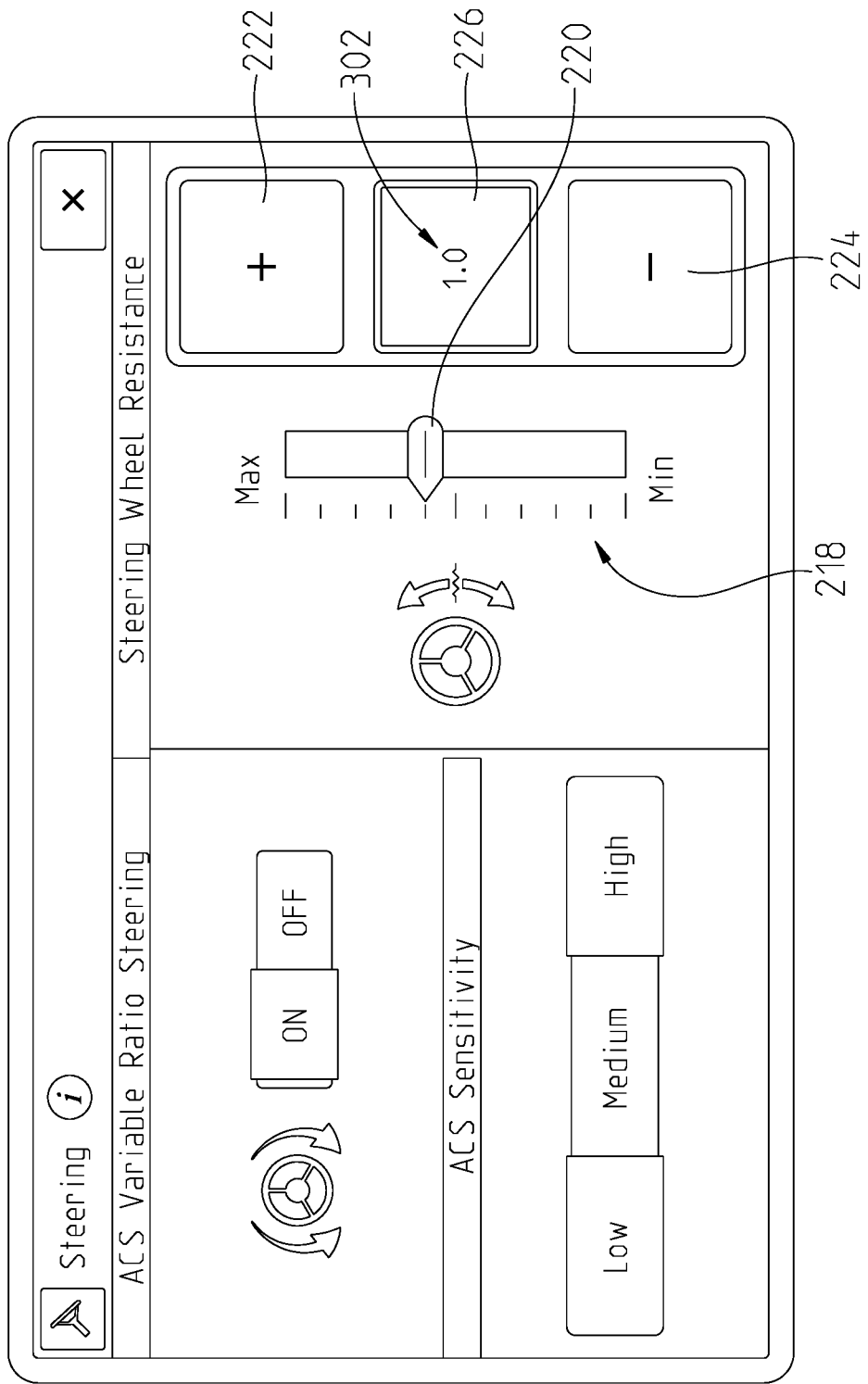

Referring now to FIGS. 3A-B, it is illustrated an operator 300 manually controlling the steering wheel resistance 218 by actuating the first user selectable control 222 to increase the feedback. As the control 222 is actuated, the feedback or resistance value increases to an increased level 302. The operator can make adjustments to any of the different selectable options by triggering or selecting one of the user selectable controls on the touchscreen 202.

Figure 4:
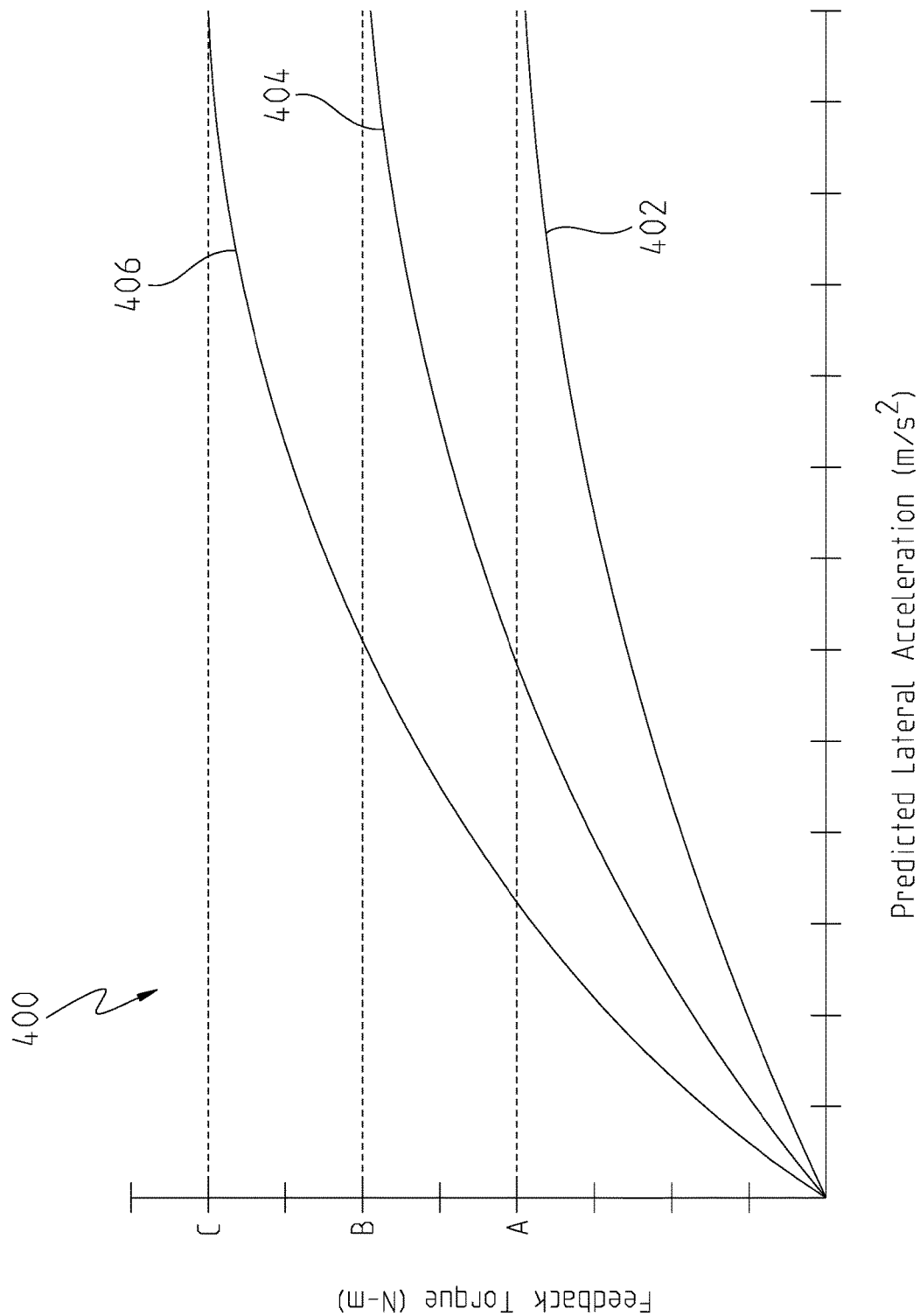
FIG. 4 is a graphical illustration of a plurality of torque feedback curves as a function of predicted lateral acceleration of a work machine.

Turning now to FIG. 4, a graphical illustration 400 provides a plurality of curves as a function of machine predicted lateral acceleration. In FIG. 2, the steering wheel resistance 218 is provided to allow an operator to set a base force or torque (i.e., base feedback) when operating the machine. As described above, the operator is able to adjust this base feedback setting by actuating the first and second user selectable controls 222, 224. During operation, as the work machine begins to turn or corner, the feedback device 34 provides a response or feedback to the operator indicative of the base feedback. As a result, the operator can feel or sense the machine steering during operation.

This base feedback setting, however, is only a base amount of feedback the operator may receive on the basis of the present disclosure. The operator is able to increase the amount of feedback received during operating the machine by actuating the low, medium or high selectable controls on the display screen 202 of FIG. 2. This additional torque feedback is based on predicted lateral acceleration, and in FIG. 4, several curves illustrate the different torque amount that can be added. For example, a first torque feedback curve 402 is illustrative of a low sensitivity selection being made by the operator when the first user selectable control 212 is selected. A second torque feedback curve 404 is illustrative of a medium sensitivity selection being made by the operator when the second user selectable control 214 is triggered. A third torque feedback curve 406 is illustrative of a high sensitivity selection being made by the operator when the third user selectable control 216 is selected. Each of the three curves may be stored in a memory unit of the ECU 40, and each curve provides a torque feedback amount based on predicted lateral acceleration of the machine.

The torque feedback again provides feedback to the operator through the steering wheel 12 when the operator is steering the machine at a transport speed and when loading the machine as it makes a turn. The feedback is designed to build confidence in the operator that the machine is being loaded. The higher sensitivity selection will provide more feedback to the operator compared to if either the low or medium sensitivity selections are enabled.

The torque feedback curves are again based on machine predicted lateral acceleration. Predicted lateral acceleration has been found to provide the ECU 40 a more timely acceleration value of the machine so that the desired torque feedback can be communicated to the operator rather than waiting for the ECU 40 to determine actual lateral acceleration. Moreover, predicted lateral acceleration allows the ECU 40 to better predict what amount of feedback the operator wants to feel, and it is based on wheel speed, i.e., how fast the machine is travelling. The faster the machine turns, the more torque feedback the operator will feel.

Predicted lateral acceleration can be computed by the ECU 40 as a function of wheel speed detected by the wheel speed sensor 30, position of the steering wheel 12 detected by the steering wheel position sensor 24, road wheel angle as detected by the wheel position sensor 26, and the sensitivity level selected by the operator from the active command steering sensitivity 210. These inputs may be communicated to and received by the ECU 40, which may be a steering system controller, machine or vehicle controller, or any other controller on the machine. From these inputs, the ECU may compute the predicted lateral acceleration in any conventional manner (e.g., via an algorithm or formula) and then determine the feedback torque from one of the curves in FIG. 4. Alternatively, the curves may be provided as data in a lookup table from which the ECU 40 may retrieve the feedback torque. In any event, once the feedback torque is determined by the ECU 40, the ECU 40 may output a torque command to the feedback device 34 to provide the additional amount of feedback torque (in addition to the base torque set via the steering wheel resistance 218) to the steering wheel 12. In one non-limiting example, the feedback device may be a tactile feedback device or a force feedback device. In this embodiment, the ECU 40 is limited to providing passive feedback to the operator rather than active feedback since the ECU 40 does not actively control the steering of the machine.

In the present disclosure, the steering system is not mechanical but rather is electronically-controlled and comprises electro-hydraulic steering valves. As a result, the feedback received by the operator from the feedback device 34 may also alert the operator to the location of on-center with respect to the steering wheel 12. In other words, as the operator turns the wheel, the wheel is not biased back to the on-center position where the machine drives along a substantially straight path. Thus, as the operator continues to rotate or turn the steering wheel 12, the amount of feedback may increase, whereas as the operator returns the steering wheel 12 to is on-center position the feedback may decrease. Consequently, the amount of feedback from the feedback device 34 provides a response to the operator to better feel for where the on-center position is at.

Referring to FIG. 4, the actual values of the torque feedback and predicted lateral acceleration may vary depending on the embodiment. When the low sensitivity curve 402 is selected, the maximum amount of additional torque feedback may correspond to a torque amount A. When the medium sensitivity curve 404 is selected, the maximum amount of additional torque feedback may correspond to a torque amount B. In this embodiment, torque amount B is greater than torque amount A at a predicted lateral acceleration greater than zero. When the high sensitivity curve 406 is selected, the maximum amount of additional torque feedback may correspond to a torque amount C. In this embodiment, torque amount C is greater than torque amount A and B at a predicted lateral acceleration greater than zero. Thus, an operator will receive more torque feedback and thus more responsiveness when making a turn if the operator selects the third user selectable control 216 compared to if the first or second user selectable controls 212, 214 are selected.

The torque feedback curves of FIG. 4 are illustratively-shaped according to one embodiment. In another embodiment, the curves may be more parabolically-shaped. In a different embodiment, the curves may have a more square-like or step-like shape. In other words, the shape of the torque feedback curves in FIG. 4 are not intended to be limiting and may correspond to various shapes as a function of predicted lateral acceleration.

In one embodiment, the torque level C may be 1.5 times or more of torque level A. For example, the torque level C may be at least twice torque level A in one embodiment. In another embodiment, torque level C may be at least three times torque level A. In a further embodiment, torque level C may be at least four times torque level A.

In one embodiment, the torque level B may be 1.5 times or more of torque level A. For example, the torque level B may be at least twice torque level A in one embodiment. In another embodiment, torque level B may be at least three times torque level A. In a further embodiment, torque level B may be at least four times torque level A.

In one embodiment, the torque level C may be 1.5 times or more of torque level B. For example, the torque level C may be at least twice torque level B in one embodiment. In another embodiment, torque level C may be at least three times torque level B. In a further embodiment, torque level C may be at least four times torque level B.

Figure 5:
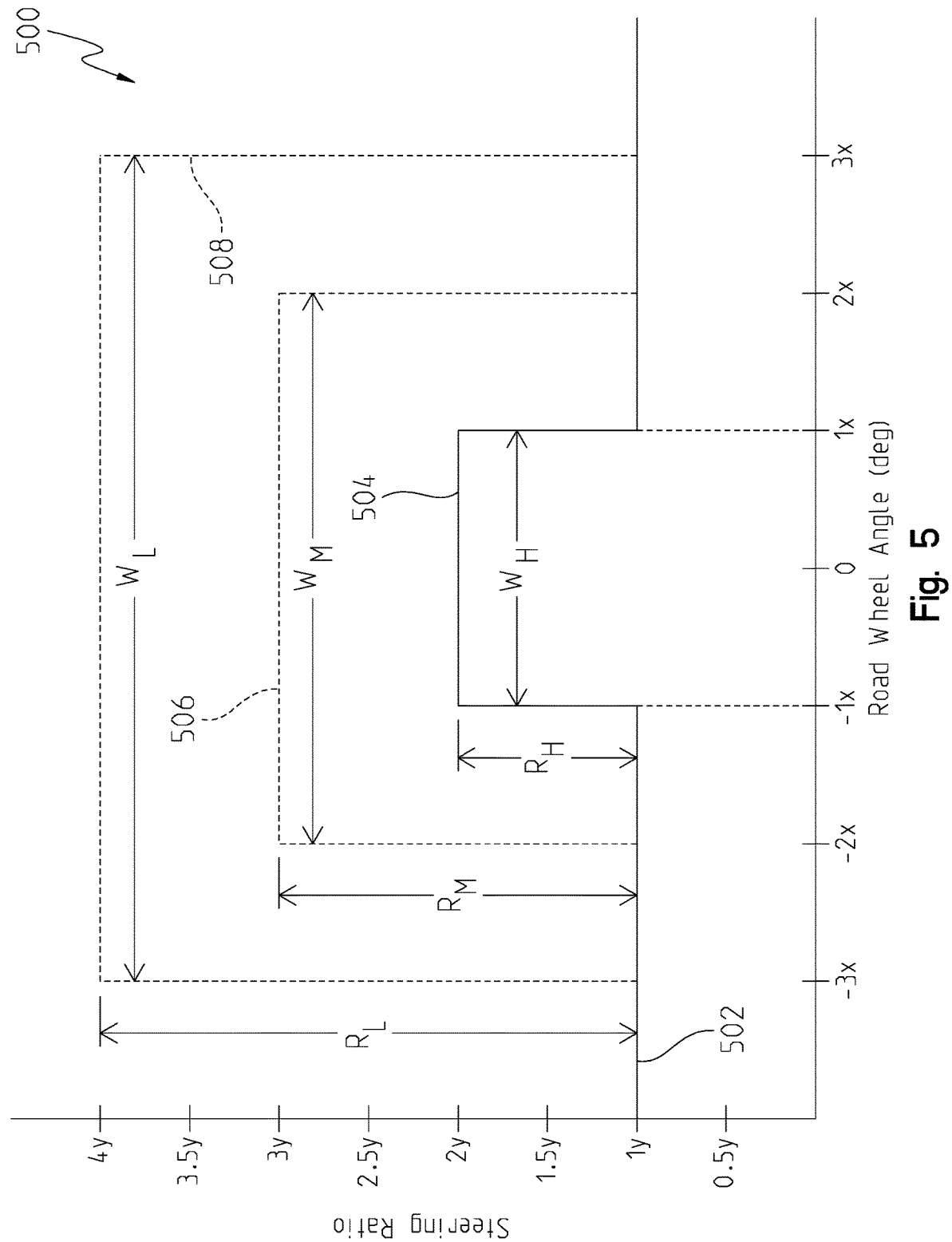
FIG. 5 is a graphical illustration of a first embodiment of a plurality of steering ratio sensitivity curves as a function of road wheel angle.

Referring now to FIG. 5, the active command steering sensitivity 210 selection operably controls the amount of torque feedback provided to the operator on the basis of the different sensitivity curves of FIG. 4 as well as the sensitivity of steering ratio and width of the on-center steering ratio as a function of road wheel angle. In other words, the selection made on the display screen 202 by actuating controls 212, 214, 216 impacts the torque feedback and steering responsiveness relative to operating on-center. The on-center steering ratio, or referred to as on-center ratio, is triggered when the operator is steering the work machine along a substantially straight path. In FIG. 5, a graphical illustration 500 provides a plurality of on-center steering ratio curves as a function of road wheel angle. Road wheel angle may be detected by the road wheel angle sensor 26 and communicated to the ECU 40.

The plurality of on-center ratio curves may include a first curve 504 corresponding a maximum sensitivity level, a second curve 506 corresponding to a medium sensitivity level, and a third sensitivity curve 508 corresponding to a low sensitivity level. To activate or operate according to the first curve 504, the operator may select the third user selectable control 216 from the display screen 202. To activate or operate according to the second curve 506, the operator may select the second user selectable control 214 from the display screen 202. Further, to activate or operate according to the third curve 506, the operator may select the first user selectable control 212 from the display screen 202.

Each curve includes two components or features. The first feature is the overall width of the curve and the second feature is the steering ratio while operating along the curve. The curves are defined relative to road wheel angle. Road wheel angle is sensed by the road wheel angle sensor 26 and corresponds to the angle at which the steered wheel contacts the ground or road surface. When the machine is travelling substantially straight, i.e., on-center, the road wheel angle is zero or approximately zero degrees. The steering ratio along the y-axis of FIG. 5 is a ratio related to the angle at which an operator turns the steering wheel relative to the actual road wheel angle of the steered wheel. For instance, if the steering ratio is 40:1, the operator will need to turn the steering wheel approximately 40° in order to achieve a 1° road wheel angle.

When the operator is steering the machine on-center or substantially straight, each on-center ratio curve may produce a first ratio, and when the operator begins to turn the steering wheel such as when turning the machine, the curve may default to a standard or default steering ratio. The interaction between these two ratios may be dependent upon the width of the respective on-center ratio curve.

To better understand this, suppose the operator selects the third user selectable control 216 corresponding to the high sensitivity level. Upon doing so, the ECU 40 may refer to a lookup table of values or the curves of FIG. 5 to control steering. The high sensitivity level corresponds to the first curve 504 in FIG. 5. Here, the width of the first curve 504 is defined as $W_H$. The width, $W_H$, corresponds to a road wheel angle between −1x and 1x degrees. For sake of a non-limiting example, if x equals 0.5, then the steer ratio, $R_H$, will be set at 2y between −0.5 and 0.5 degrees of road wheel angle.

In the event the operator selects the medium sensitivity level corresponding to the second curve 506, the width of the second curve 506 is defined as $W_M$. The width, $W_M$, corresponds to a road wheel angle between −2x and 2x degrees. Again assuming x equals 0.5 in this example, the steer ratio, $R_M$, when operating according to the second curve 506 will be 3y between −1 and 1 degrees of road wheel angle. Similarly, if the operator selects the low sensitivity level corresponding to the third curve 508, the width of the second curve 508 is defined as $W_L$. The width, $W_L$, corresponds to a road wheel angle between −3x and 3x degrees. Again assuming x equals 0.5 in this example, the steer ratio, $R_L$, when operating according to the third curve 508 will be 4y between −1.5 and 1.5 degrees of road wheel angle.

The width of the first curve 504 corresponding to the high sensitivity level is smaller than the width of the second curve 506 corresponding to the medium sensitivity level, and the width of the second curve 506 is smaller than the width of the third curve 508 corresponding to the low sensitivity level. In the same way, the steering ratio of the first curve 504 is smaller than the steering ratio of the second curve 506, and the steering ratio of the second curve 506 is smaller than the steering ratio of the third curve 508.

The smaller steering ratio corresponding to the first curve 504 is the most aggressive and most responsive of the three curves, whereas the higher steering ratio corresponding to the third curve 508 is the least aggressive and least responsive of the three curves. To state it another way, if the operator makes a small steering wheel movement (i.e., trying to maintain a straight path), the more aggressive steering ratio of the first curve 504 will result in a greater road wheel angle or yaw command of the machine than the other two curves. Thus, the small steering wheel movement will result in a more responsive steering movement of the machine than if operating along the second or third curves.

While operating along one of the on-center steering curves, the machine steering will behave differently than when operating outside of the defined width of the corresponding curve. In FIG. 5, when an operator desires to steer the machine through a turn, for example, the machine is no longer operating on-center. Thus, the default steering ratio may be predefined or set at a base steering ratio 502 of 1y. If y equals 10, then the standard steering ratio is 10:1 which means as the operator turns the steering wheel, the road wheel angle changes more quickly than if the operator were steering the machine on-center. Further, if the operator is operating along the first curve 504 and y equals 1, the resulting steering ratio is 20:1. Thus, the standard or base steering ratio is twice as responsive than if operating according to the first on-center ratio curve 504. Of course, if y equals 1 and the operator selects the medium sensitivity level, the on-center steering ratio of the second curve 506 equates to 3y or 30:1. And if the operator selects the low sensitivity level, the on-center steering ratio of the third curve 508 is 4y or 40:1. From this example, it is shown that an operator may select a more or less responsive steering system based on the sensitivity level selected from the active command steering sensitivity 210.

The operator can select any of the three sensitivity levels or modes while operating the machine. Thus, if the operator desires more torque feedback and more responsive steering, the operator may select the third user selectable control 216 corresponding to high sensitivity. If the operator desires less torque feedback and less responsive steering, the operator may select the medium or low sensitivity level or mode.

Figure 6:
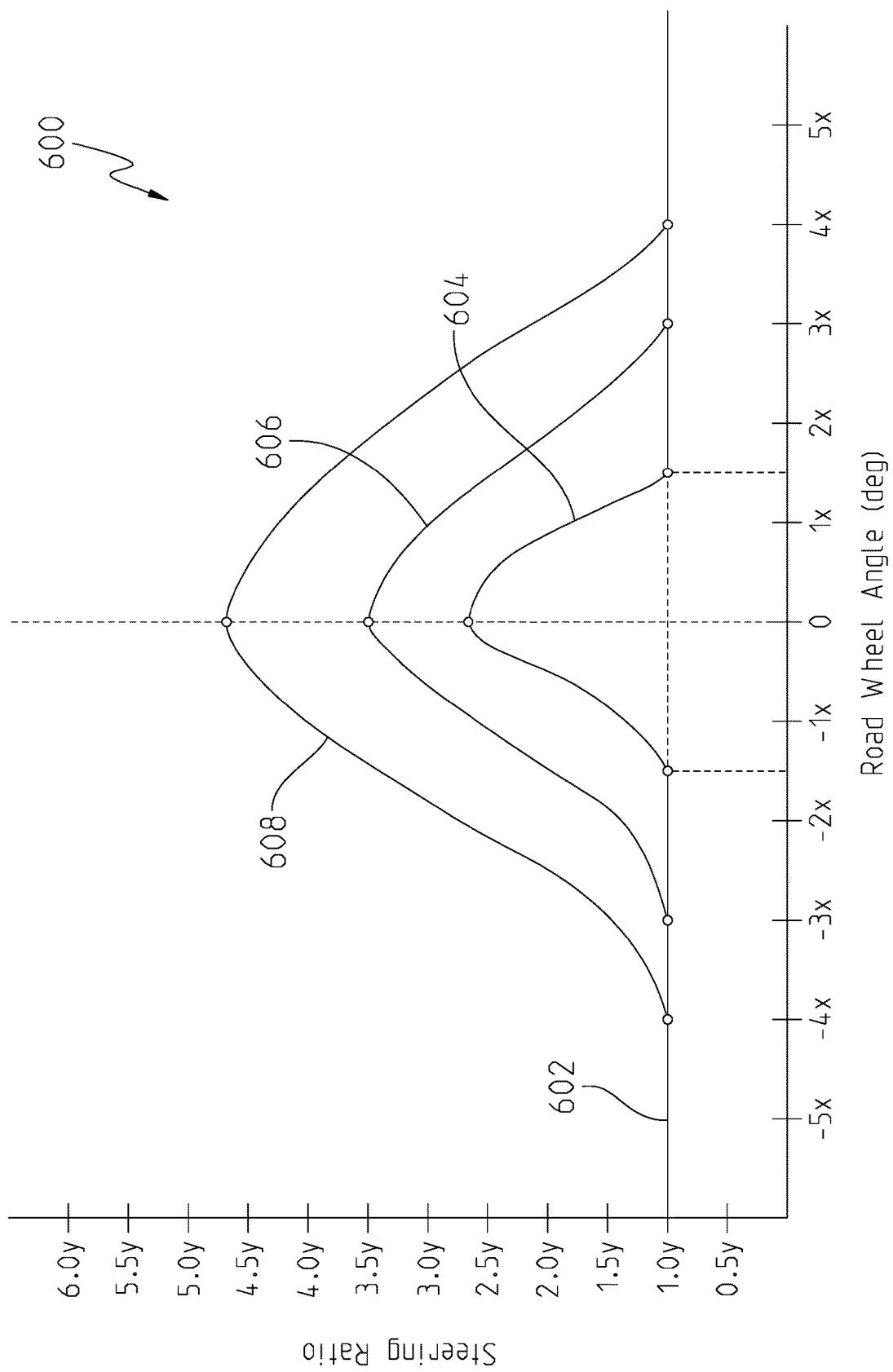
FIG. 6 is a graphical illustration of a second embodiment of a plurality of steering ratio sensitivity curves as a function of road wheel angle.
Figure 7:
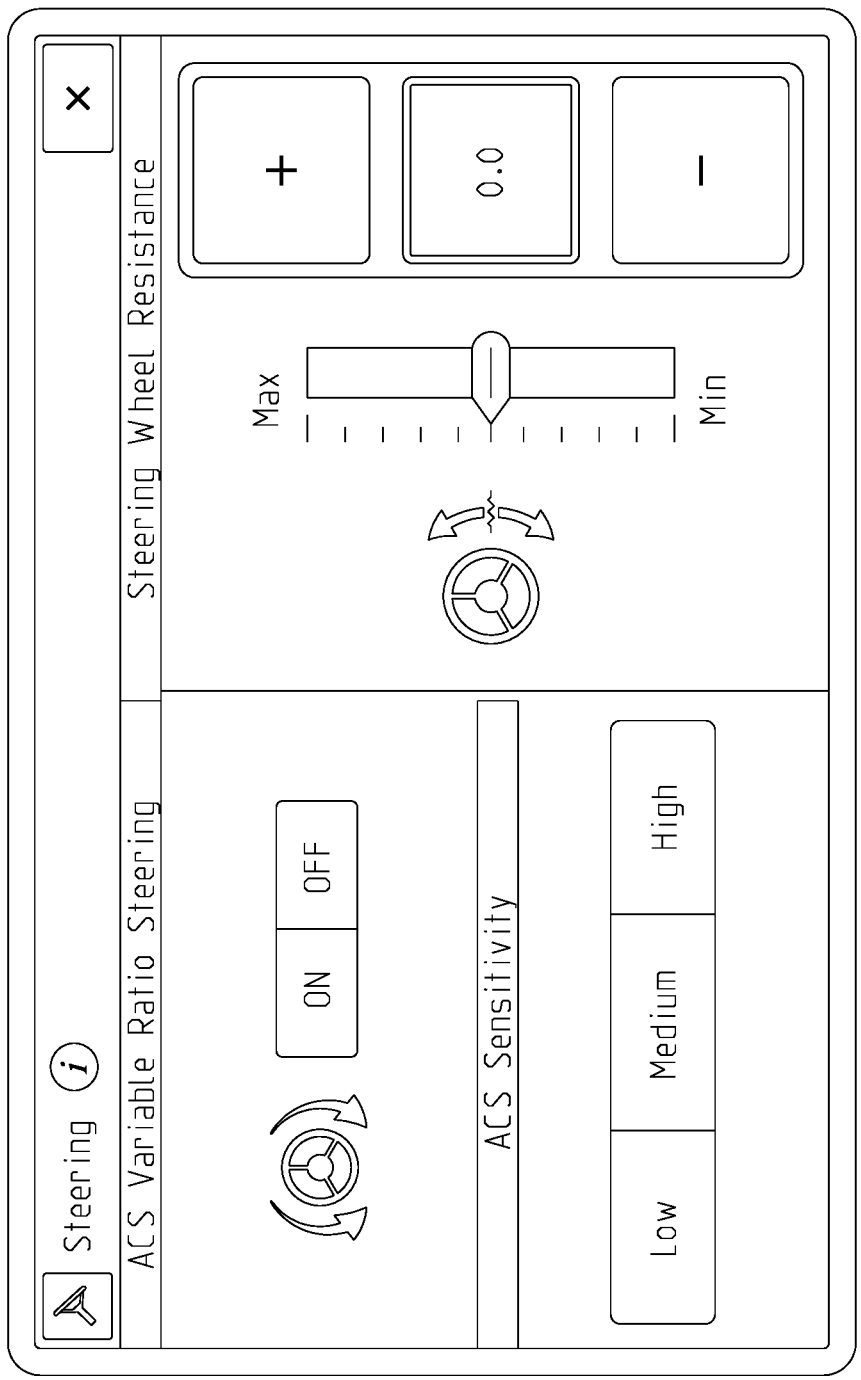
FIG. 7 is a screen display of the operator control of FIG. 2 without any button selected.
Figure 8:
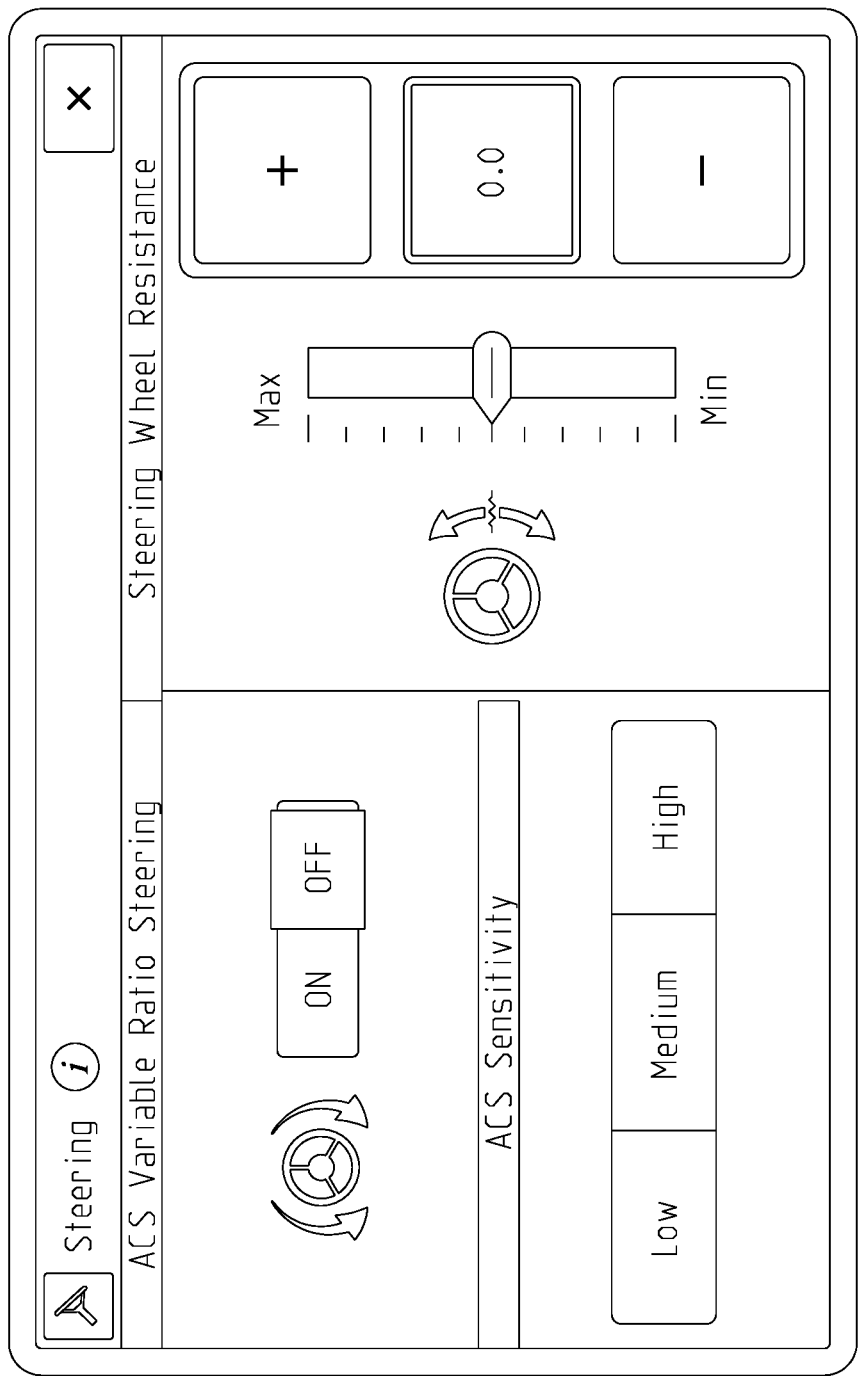
FIG. 8 is a screen display of the operator control of FIG. 2 with the ACS variable ratio steering in the off position.
Figure 9:
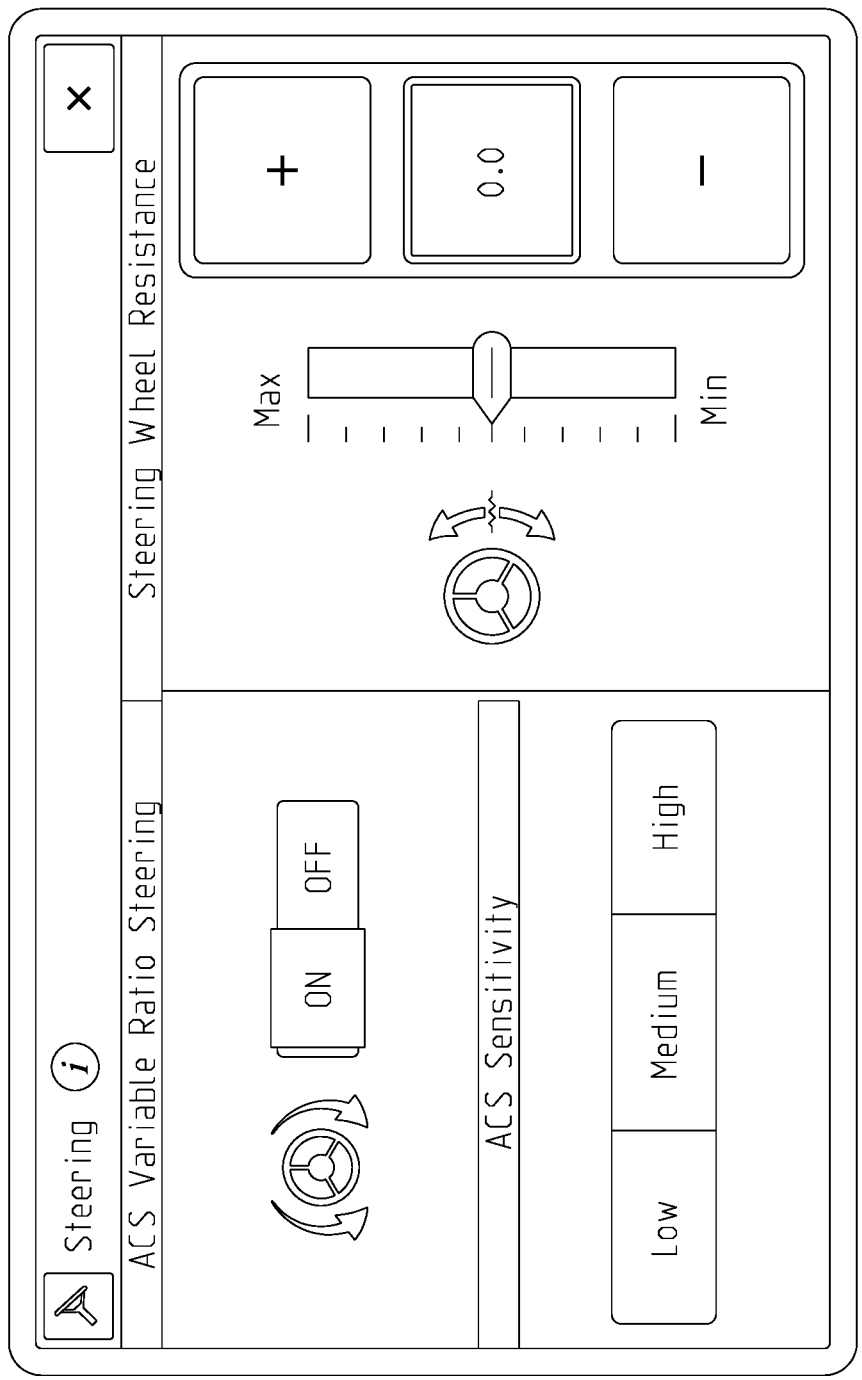
FIG. 9 is a screen display of the operator control of FIG. 2 with the ACS variable ratio steering in the on position.
Figure 10:
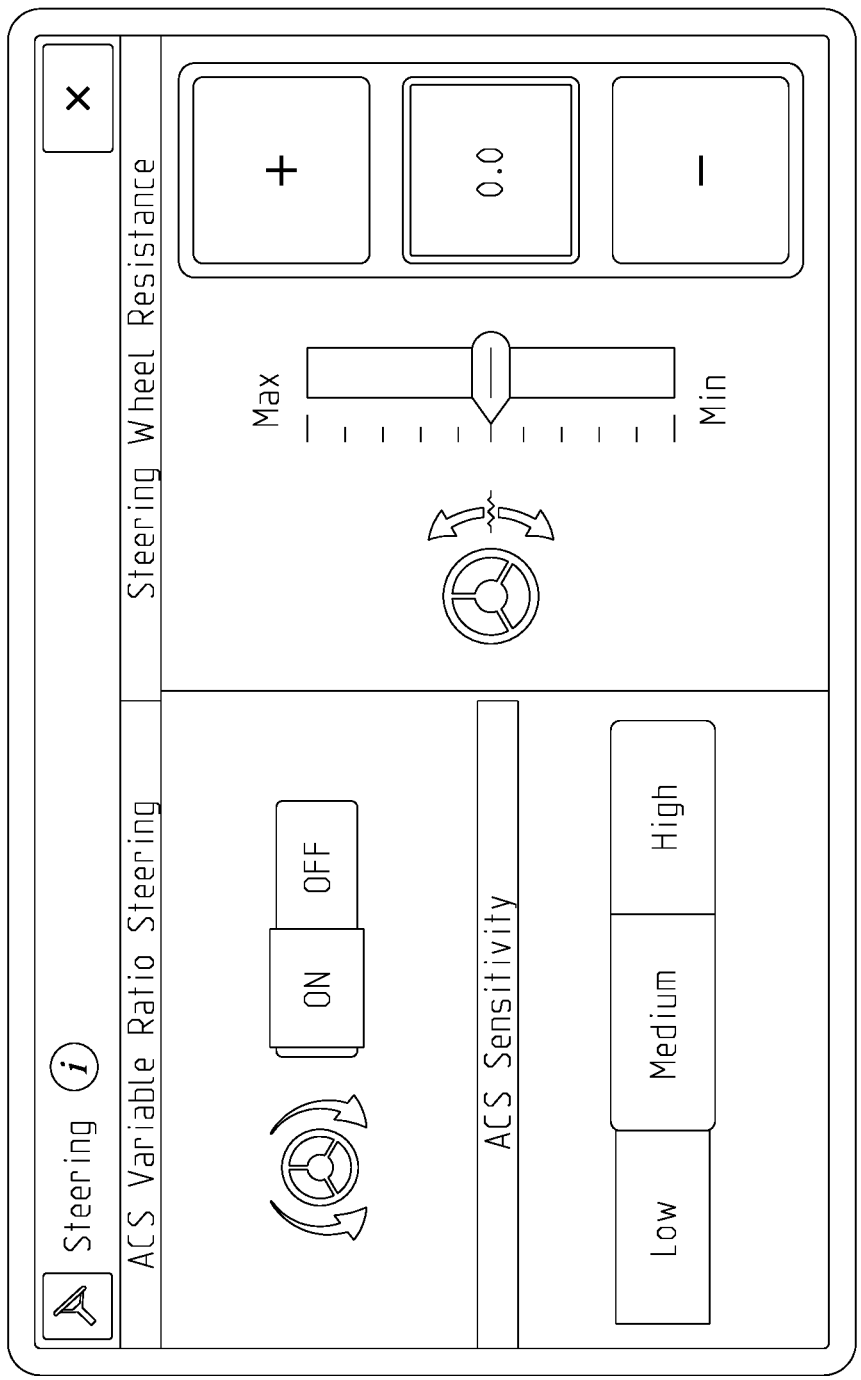
FIG. 10 is a screen display of the operator control of FIG. 2 with the ACS variable ratio steering in the on position and the ACS sensitivity at a low setting.
Figure 11:
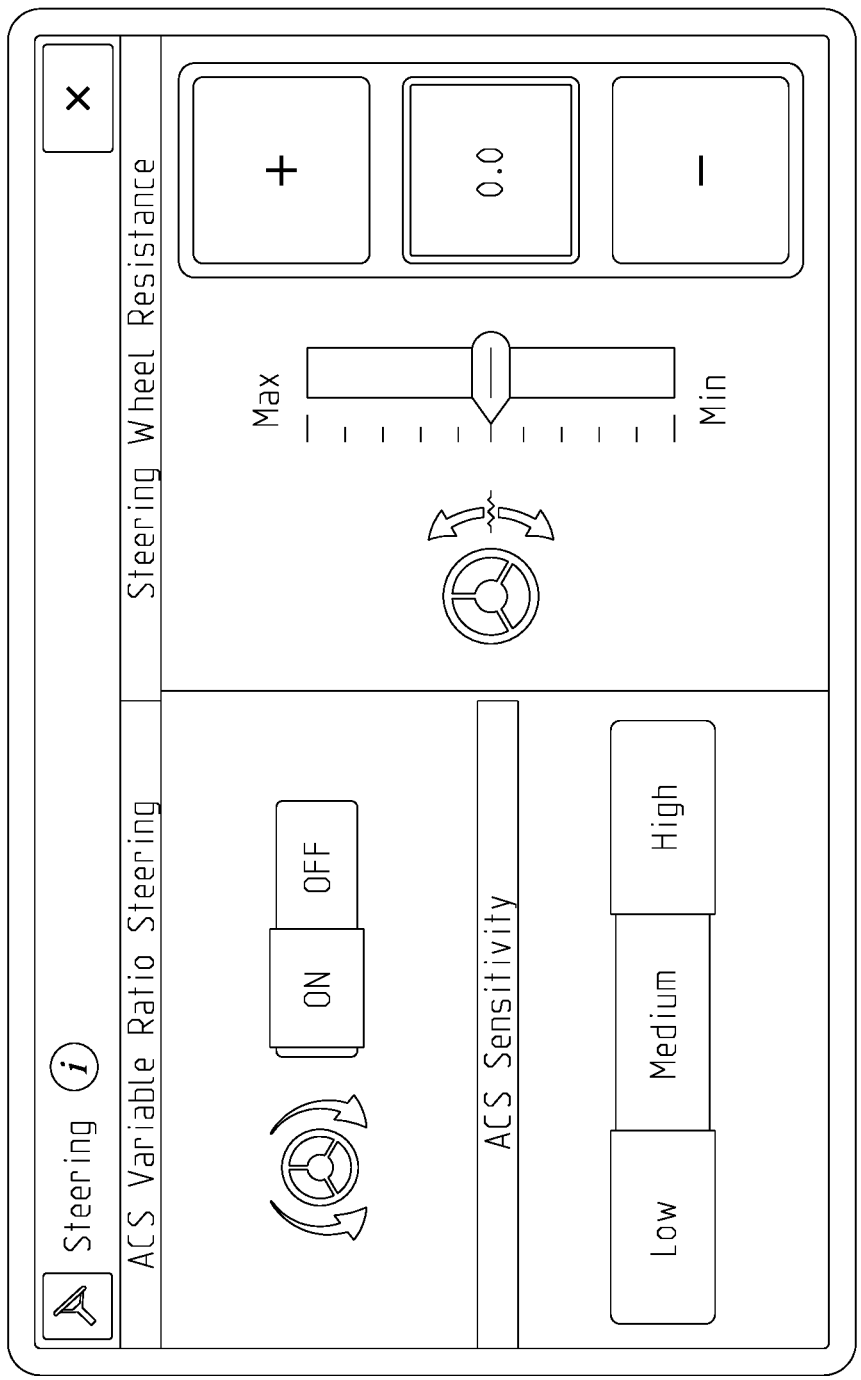
FIG. 11 is a screen display of the operator control of FIG. 2 with the ACS variable ratio steering in the on position and the ACS sensitivity at a medium setting.
Figure 12:
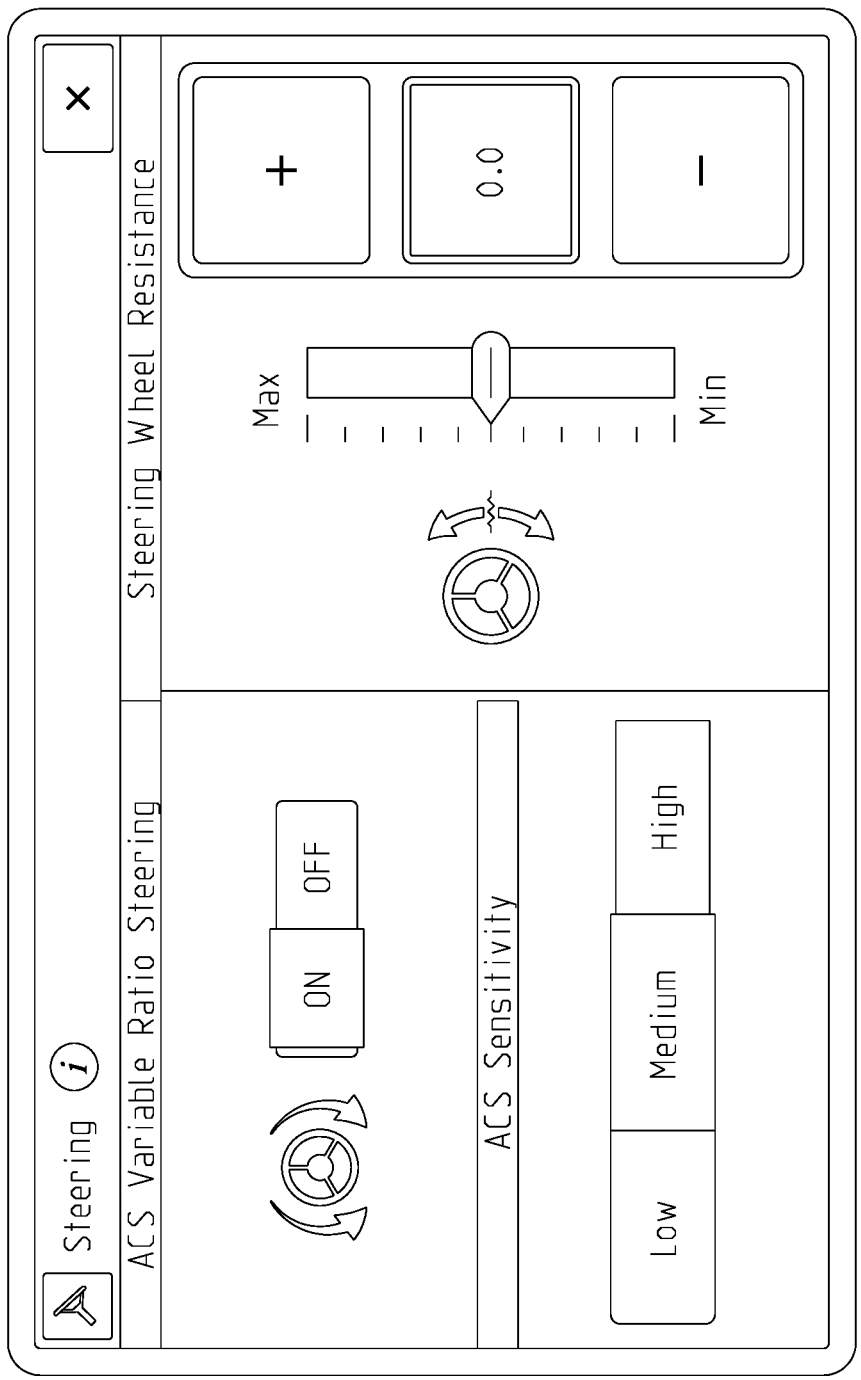
FIG. 12 is a screen display of the operator control of FIG. 2 with the ACS variable ratio steering in the on position and the ACS sensitivity at a high setting.
Figure 13:
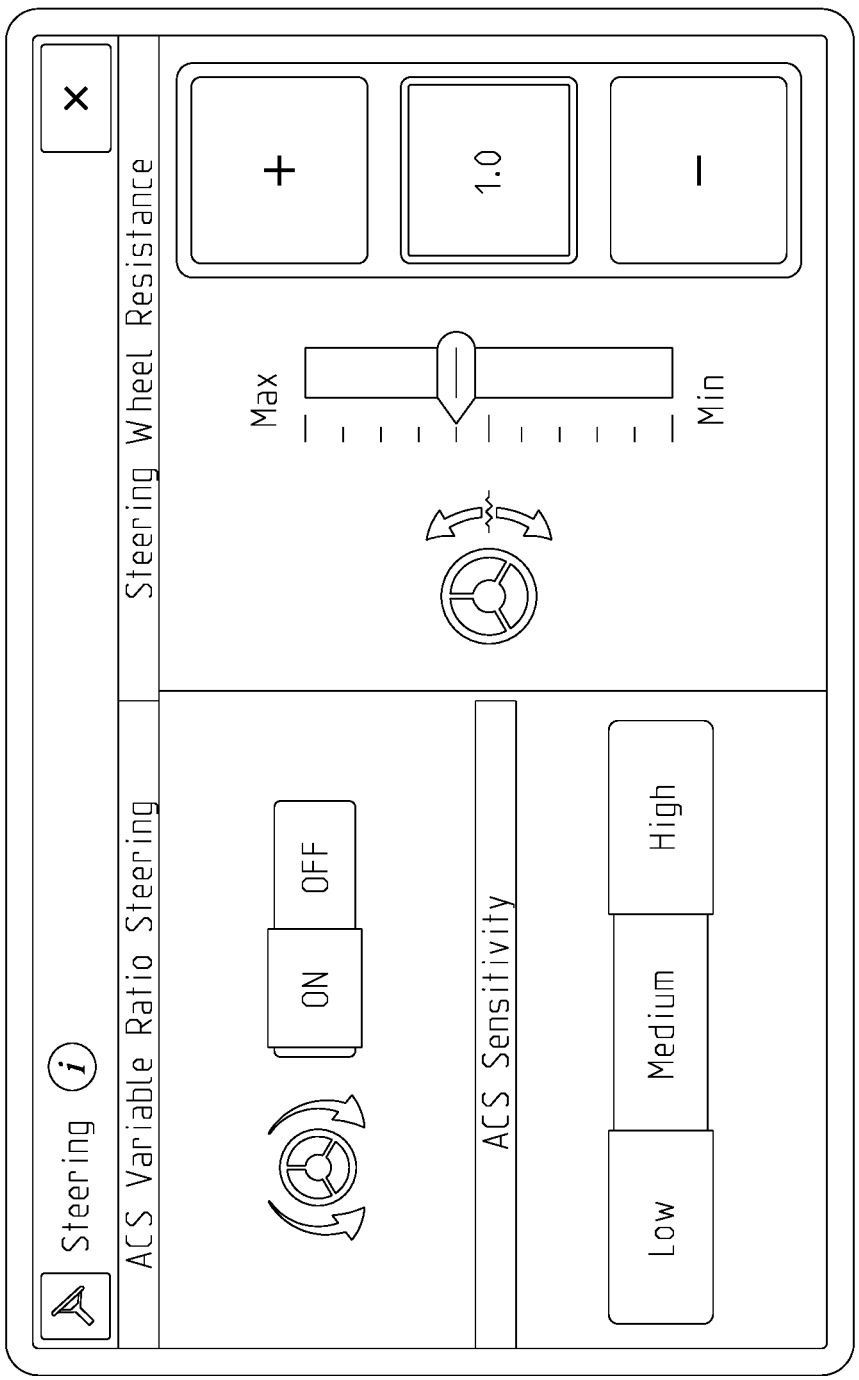
FIG. 13 is a screen display of the operator control of FIG. 2 with the ACS variable ratio steering in the on position, the ACS sensitivity at a medium setting, and the steering wheel resistance adjusted in a positive direction.
Figure 14:
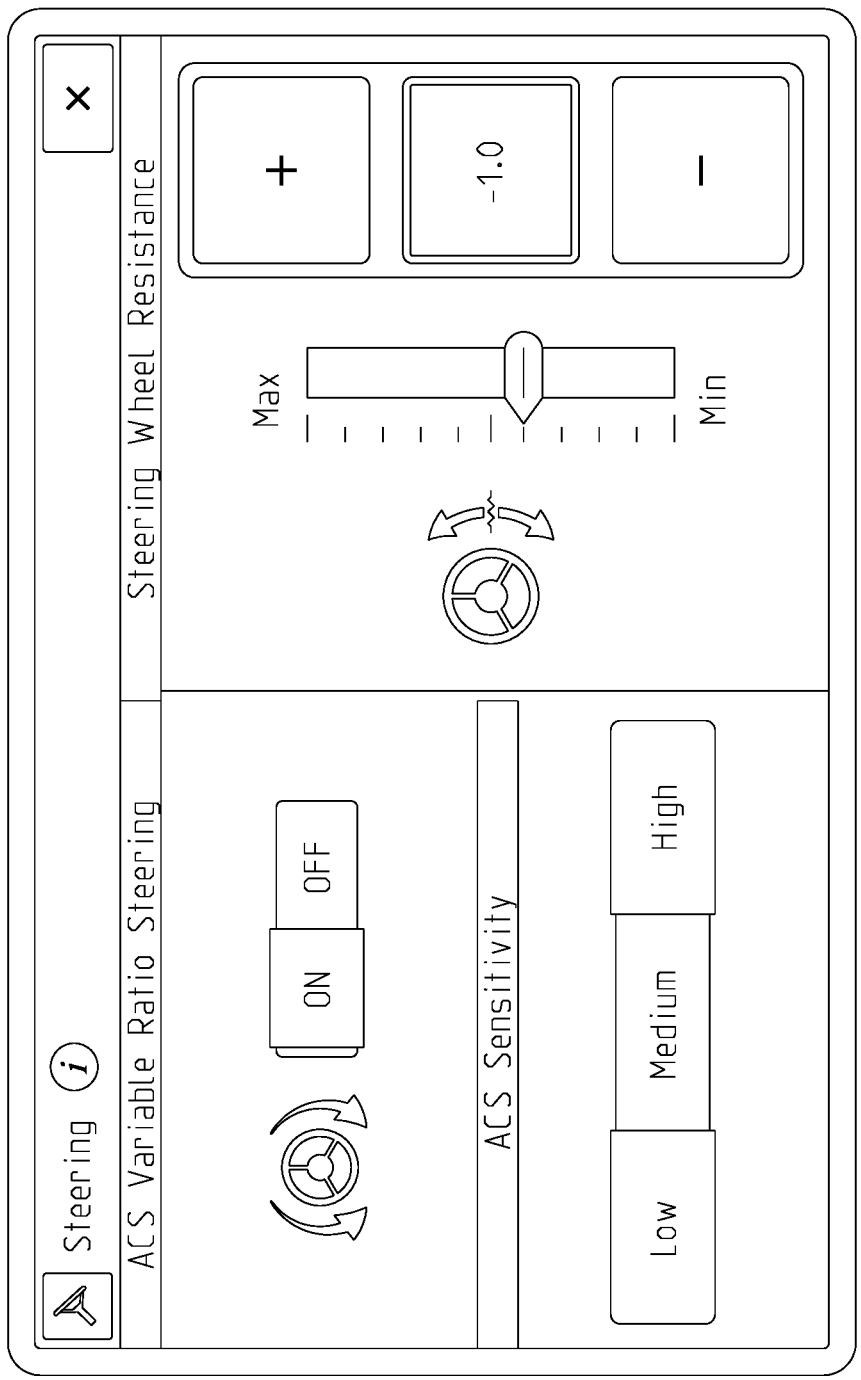
FIG. 14 is a screen display of the operator control of FIG. 2 with the ACS variable ratio steering in the on position, the ACS sensitivity at a medium setting, and the steering wheel resistance adjusted in a negative direction.

The on-center ratio curves of FIG. 5 are illustrated as step-like functions or square-shaped curves. This, however, is only intended to be illustrative of one embodiment of the present disclosure. The curves may take the form or shape of something other than square or step-like curves. For instance, in FIG. 6, a graphical illustration 600 is provided of on-center ratio curves that are more parabolic-shaped compared to the curves of FIG. 5. The illustration 600 again provides a base or default steering ratio 602 corresponding to a ratio of 1.0y where y may be any number. A first curve 604 corresponds to a high sensitivity level or mode, a second curve 606 corresponds to a medium sensitivity level or mode, and a third curve 608 may correspond to a low sensitivity level or mode. The widths of each curve may change due to the shape of the respective curve. The maximum steering ratio of the first curve 604 is less than the maximum steering ratio of the second curve 606, and the maximum steering ratio of the second curve 606 is less than the maximum steering ratio of the third curve 608. Similarly, the width of the first curve 604 is less than the width of the second curve 606, and the width of the second curve 606 is less than the width of the third curve 608. These characteristics of the curves in FIG. 6 are similar to the characteristics of the curves in FIG. 5. Thus, the first curve 604 provides greater responsiveness when steering on-center compared to the second and third curves, but the second and third curves remain in the on-center position for a great range of road wheel angles compared to the first curve 604 due to their greater widths.

In the present disclosure, there are three sensitivity levels or modes described. In other embodiments, however, there may be a high and a low sensitivity level or mode (e.g., only two such levels or modes). Alternatively, there may be more than three sensitivity levels or modes. Thus, the number of sensitivity levels or modes is not intended to be limiting. For example, a dial or digital display may be provided where the operator is capable of selecting any one of a plurality of sensitivity levels or modes, where each mode outputs a different torque feedback as a function of predicted lateral acceleration and on-center responsiveness based on road wheel angle.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A method of controlling a work machine having at least one wheel, comprising:
providing a controller, an operator control, and a steering system including a steering wheel position sensor, a road wheel angle sensor, a speed sensor, and a feedback device;
detecting a change in steering wheel position via the steering wheel position device;
detecting a wheel speed of the at least one wheel via the speed sensor;
calculating a predicted lateral acceleration of the work machine by the controller as at least a function of wheel speed and a sensitivity level selectable from the operator control;
determining a feedback torque by the controller as a function of the predicted lateral acceleration, the feedback torque being determined from a plurality of feedback torque curves stored by the controller, where each of the plurality of feedback torque curves corresponds to the sensitivity level; and
outputting a feedback torque command by the controller to the feedback device where the feedback torque command comprises the feedback torque determined from one of the plurality of feedback torque curves as a function of the predicted lateral acceleration computed in the calculating step.

2. The method of claim 1, further comprising providing dynamic feedback to a steering wheel of the work machine based on the feedback torque.

3. The method of claim 1, further including receiving a base feedback setting from the operator control, and wherein the outputting step comprises outputting a feedback torque command comprising the base feedback setting and the feedback torque, where the feedback torque is in addition to the base feedback setting.

4. The method of claim 3, further comprising receiving another command from the operator control corresponding to a user adjustment in the base feedback setting.

5. The method of claim 1, wherein the plurality of feedback torque curves comprises at least a first curve and a second curve, the first curve corresponding to a first sensitivity level and the second curve corresponding to a second sensitivity level.

6. The method of claim 5, further comprising outputting a greater amount of feedback torque at the first sensitivity level than at the second sensitivity level.

7. The method of claim 5, further comprising receiving a command from the operator control selecting the first sensitivity level or the second sensitivity level.

8. The method of claim 7, further comprising providing a plurality of on-center steering ratio curves stored in the controller, where each of the plurality of on-center steering ratio curves defines a steering ratio as a function of road wheel angle.

9. The method of claim 8, further comprising:
detecting road wheel angle via the road wheel angle sensor;
determining a steering ratio from one of the plurality of on-center steering ratio curves based on the selection of the first sensitivity level or the second sensitivity level and as a function of the road wheel angle.

10. An electrohydraulic steer-by-wire steering system for steering at least one wheel of a work machine, comprising:
a controller;
an operator control in communication with the controller, the operator control configured to being selectable by an operator of the work machine;
a steering wheel position sensor for detecting a change in position of a steering wheel of the work machine;
a road wheel angle sensor for detecting a road wheel angle of the at least one wheel;
a speed sensor for detecting a wheel speed of the at least one wheel;
a software algorithm executable by the controller, the software algorithm comprising a plurality of on-center steering ratio curves based on the road wheel angle of the at least one wheel;
a feedback device configured to provide a feedback torque to the steering wheel as a function of predicted lateral acceleration that is determined by the controller as at least a function of a sensitivity level selectable from the operator control;
wherein, the plurality of on-center steering ratio curves comprises at least a first curve and a second curve, the first curve outputting a first maximum steering ratio over a first defined range of road wheel angles and the second curve outputting a second maximum steering ratio over a second defined range of road wheel angles;
wherein, the first maximum steering ratio is greater than the second maximum steering ratio at any road wheel angle located within the first and second defined ranges.

11. The system of claim 10, wherein the first defined range is less than the second defined range of road wheel angles.

12. The system of claim 10, wherein each of the plurality of on-center steering ratio curves comprises a default steering ratio when operating outside of a corresponding defined range of road wheel angles.

13. The system of claim 10, wherein the steering ratio of the first curve and the second curve is approximately the same when the road wheel angle is outside of both the first and second defined ranges.

14. The system of claim 10, wherein:
the operator control comprises a display screen including at least a first user selectable control and a second user selectable control;
the first user selectable control triggering the controller to execute the software algorithm in accordance with the first curve;
the second user selectable control triggering the controller to execute the software algorithm in accordance with the second curve.

15. The system of claim 10, wherein the predicted lateral acceleration is further determined as a function of the wheel speed, position of the steering wheel, and the road wheel angle.

16. An electrohydraulic steer-by-wire steering system for steering at least one wheel of a work machine, comprising:
a controller;
an operator control in communication with the controller, the operator control configured to being selectable by an operator of the work machine;
a steering wheel position sensor for detecting a change in position of a steering wheel of the work machine;
a road wheel angle sensor for detecting a road wheel angle of the at least one wheel;
a speed sensor for detecting a wheel speed of the at least one wheel;
a software algorithm executable by the controller, the software algorithm comprising a plurality of on-center steering ratio curves based on the road wheel angle of the at least one wheel;
a feedback device in communication with the controller and the steering wheel, the feedback device configured to provide a feedback torque to the steering wheel as a function of predicted lateral acceleration that is determined as at least a function of a sensitivity level selectable from the operator control;
wherein, the plurality of on-center steering ratio curves comprises at least a first curve and a second curve, the first curve outputting a first maximum steering ratio over a first defined range of road wheel angles and the second curve outputting a second maximum steering ratio over a second defined range of road wheel angles;
wherein the first defined range is less than the second defined range of road wheel angles.

17. The system of claim 16, wherein the first maximum steering ratio is greater than the second maximum steering ratio at any road wheel angle located within the first and second defined ranges.

18. The system of claim 16, wherein:
the operator control comprises a display screen including at least a first user selectable control and a second user selectable control;
the first user selectable control triggers the controller to execute the software algorithm in accordance with the first curve;
the second user selectable control triggers the controller to execute the software algorithm in accordance with the second curve.

19. The system of claim 16, wherein the predicted lateral acceleration is further determined as a function of the wheel speed, position of the steering wheel, and the road wheel angle.

20. The system of claim 16, wherein the plurality of on-center steering ratio curves comprises a third curve outputting a third maximum steering ratio over a third defined range of road wheel angles;
wherein, the third defined range is greater than the first and second defined ranges of road wheel angles.

* * * * *